United States Patent
Kaulgud et al.

(10) Patent No.: US 9,569,177 B2
(45) Date of Patent: Feb. 14, 2017

(54) SERVICE EXTRACTION AND APPLICATION COMPOSITION

(71) Applicant: Accenture Global Service Limited, Dublin (IE)

(72) Inventors: Vikrant Kaulgud, Pune (IN); Saurabh Bhadkaria, Bangalore (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

(21) Appl. No.: 14/836,751

(22) Filed: Aug. 26, 2015

(65) Prior Publication Data

US 2016/0062739 A1 Mar. 3, 2016

(30) Foreign Application Priority Data

Aug. 29, 2014 (IN) .......................... 4230/CHE/2014

(51) Int. Cl.
*G06F 9/44* (2006.01)
*G06F 9/45* (2006.01)
*G06F 9/54* (2006.01)

(52) U.S. Cl.
CPC . *G06F 8/20* (2013.01); *G06F 8/30* (2013.01); *G06F 8/41* (2013.01); *G06F 8/72* (2013.01); *G06F 8/35* (2013.01); *G06F 9/541* (2013.01); *G06F 9/547* (2013.01)

(58) Field of Classification Search
CPC ................ G06F 8/20; G06F 8/30; G06F 8/41; G06F 8/72; G06F 8/35; G06F 9/541; G06F 9/547
USPC ....................................................... 717/107
See application file for complete search history.

(56) References Cited

U.S. PATENT DOCUMENTS

| | | | | |
|---|---|---|---|---|
| 2008/0209356 A1* | 8/2008 | Grechanik | .......... | G06F 9/45512 715/769 |
| 2010/0082556 A1* | 4/2010 | Srinivasan | ................ | G06F 8/72 707/693 |
| 2010/0293080 A1* | 11/2010 | Shah | ........................ | G06F 8/34 705/34 |
| 2010/0333076 A1* | 12/2010 | Cataldo | ..................... | G06F 8/20 717/140 |
| 2011/0161477 A1* | 6/2011 | Kowalski | ............ | H04L 67/2823 709/223 |

(Continued)

OTHER PUBLICATIONS

"The extended European search report", European Patent Application No. 15182668.2, dated Jan. 19, 2016, European Patent Office, 8 pages.

*Primary Examiner* — Jason Mitchell
*Assistant Examiner* — Theodore Hebert
(74) *Attorney, Agent, or Firm* — Mannava & Kang, P.C.

(57) ABSTRACT

Service extraction and application composition may include preprocessing and instrumenting an existing application that is to be converted to a service-oriented application. The existing application may be executed to generate traces related to a runtime behavior of services related to the existing application. The traces may be used to generate calling code related to the services related to the existing application. Representational state transfer (REST) application programming interfaces (APIs) that include the calling code to call the services related to the existing application may be generated. Refactored code for the existing application may be generated for invocation of the services related to the existing application by the REST APIs.

20 Claims, 35 Drawing Sheets

(56) References Cited

U.S. PATENT DOCUMENTS

| | | | |
|---|---|---|---|
| 2012/0167061 A1* | 6/2012 | Kirovski | G06F 21/125 |
| | | | 717/132 |
| 2014/0282431 A1* | 9/2014 | Delio, Jr. | G06F 11/3466 |
| | | | 717/130 |
| 2015/0040100 A1* | 2/2015 | Kalapati | G06F 8/34 |
| | | | 717/109 |
| 2015/0082286 A1* | 3/2015 | Gittelman | G06F 11/3676 |
| | | | 717/130 |
| 2016/0062739 A1* | 3/2016 | Kaulgud | G06F 8/20 |
| | | | 717/107 |

* cited by examiner

400

```
/**
 * Handles the HTTP
 * <code>POST</code> method.
 *
 * @param request servlet request
 * @param response servlet response
 * @throws ServletException if a servlet-specific error occurs
 * @throws IOException if an I/O error occurs
 */
@Override
protected void doPost(HttpServletRequest request, HttpServletResponse response)
        throws ServletException, IOException {
    //processRequest(request, response);
    String email, pass;
    String db_email, db_pass;
    boolean isLoggedIn = false;
    HttpSession userSession = request.getSession();
    PrintWriter out = response.getWriter();
    email = request.getParameter("email");
    pass = request.getParameter("pass");
    String message, messageDetail;
    message = "";
    messageDetail = "";

String messageUrl = "/message.jsp";
    RequestDispatcher dispatchMessage = request.getServletContext().getRequestDispatcher(messageUrl);

try { pass = SecureSHA1.getSHA1(pass);
        out.println("email " + email + " pass " + pass);
        DB_Conn con = new DB_Conn();
        Connection c = con.getConnection();
        String sqlGetUsers = "SELECT `email` , "
                + "`pass` FROM `user`; ";
```

FIG. 4

```
<%
        String id = request.getParameter("id");
        if (request.getParameter("id") == null) {
            response.sendRedirect("viewProducts_.jsp");
        }else {

DB_Conn c = new DB_Conn();
        Connection con = c.getConnection();

Statement st = con.createStatement();

String getProductQuery = "SELECT * FROM `products` p INNER JOIN
`images` i USING ( `product-name` ) WHERE `product_id` ="+id+" GROUP BY
`product-name` ";
        ResultSet rs = st.executeQuery(getProductQuery);

rs.next();
        //out.println(""+rs.getString("product-name"));

String product_id = rs.getString("product_id");

int product_hits = rs.getInt("hits");

String product_name = rs.getString("product-name");

String sub_category_name = rs.getString("sub-category-name");

String category_name = rs.getString("category-name");

String company_name = rs.getString("company-name");

String price = rs.getString("price");

String summary = rs.getString("summary");

String image_name = rs.getString("image-name");

1. public class XYZ extends HttpServlet

2. In this class, look for methods signatures doGet(...), doPost(...)

*FIG. 6*

1. Statement XYZ = connection.getStatement()
// where connection is an object of Type java.sql.Connection // followed by an execute query method 2. XYZ.executeQuery(...)

*FIG. 7*

```
migration.RequestToCSV call = new migration.RequestToCSV();
call.insert_servlet(request,this.getClass().getName(),
Thread.currentThread().getStackTrace()[1].getMethodName());
```

FIG. 8

```
<% migration.RequestToCSV call = new migration.RequestToCSV();
call.insert_jsp(request,this.getClass().getSimpleSQLQuery()); %>
```

FIG. 9

```
CREATE TABLE IF NOT EXISTS `data_servlet` (
  `api_id` int(10) NOT NULL AUTO_INCREMENT,
  `api_name` varchar(30) NOT NULL,
  `api_path` varchar(30) NOT NULL,
  `api_value` varchar(30) DEFAULT NULL,
  `api_description` varchar(30) DEFAULT NULL,
  `output_format` varchar(50) DEFAULT NULL,
  `method` varchar(30) NOT NULL,
  `function_name` varchar(30) DEFAULT NULL,
  `function_value` varchar(30) DEFAULT NULL,
  `function_notes` varchar(30) DEFAULT NULL,
  `function_responseclass` varchar(30) DEFAULT NULL,
  `error` varchar(30) DEFAULT NULL,
  `parameter` varchar(200) NOT NULL,
  `parameter_description` varchar(100) DEFAULT NULL,
  `values_passed` varchar(1000) DEFAULT NULL,
  `calling_code_json` varchar(1500) DEFAULT NULL,
  `calling_code_xml` varchar(1500) DEFAULT NULL,
  `line` varchar(10) DEFAULT NULL,
  `md5` varchar(512) DEFAULT NULL,
  PRIMARY KEY (`api_id`)
) ENGINE=InnoDB  DEFAULT CHARSET=latin1 AUTO_INCREMENT=3 ;
```

*FIG. 10*

```
CREATE TABLE IF NOT EXISTS `data_jsp` (
  `api_id` int(10) NOT NULL AUTO_INCREMENT,
  `api_name` varchar(30) NOT NULL,
  `api_path` varchar(30) NOT NULL,
  `api_value` varchar(30) DEFAULT NULL,
  `api_description` varchar(30) DEFAULT NULL,
  `output_format` varchar(50) NOT NULL,
  `method` varchar(30) NOT NULL,
  `function_name` varchar(30) DEFAULT NULL,
  `function_value` varchar(30) DEFAULT NULL,
  `function_notes` varchar(30) DEFAULT NULL,
  `function_responseclass` varchar(200) DEFAULT NULL,
  `error` varchar(30) DEFAULT NULL,
  `parameter` varchar(200) NOT NULL,
  `parameter_description` varchar(200) DEFAULT NULL,
  `values_passed` varchar(1000) DEFAULT NULL,
  `calling_code_json` varchar(1500) DEFAULT NULL,
  `calling_code_xml` varchar(1500) DEFAULT NULL,
  `md5` varchar(512) NOT NULL,
  PRIMARY KEY (`api_id`)
) ENGINE=InnoDB  DEFAULT CHARSET=latin1 AUTO_INCREMENT=5 ;
```

*FIG. 11*

```
                StringWriter out = new StringWriter();
1200                PrintWriter printOut = new PrintWriter(out);
                HttpServletResponse mockResponse = mock(HttpServletResponse.class);
                when(mockResponse.getWriter()).thenReturn(printOut);
        request_main.setAttribute("email",email);
        request_main.setAttribute("pass",pass);
        loginRegister.loginServlet cn=new loginRegister.loginServlet();
        request_main.getSession().setAttribute("query_result","failure");
        cn.doPost(request_main, mockResponse);
        DB_Check db = new DB_Check();
                JSONObject json = new JSONObject();
                if
        (request_main.getSession().getAttribute("query_result").toString().equals("success
        ")) {
                    json.put("status", "OK");
                    json.put("message", (String)
        request_main.getSession().getAttribute("query_result"));
                } else {
                    json.put("status", "ERROR");
                    json.put("message", "failed");
                    if (db.check_db() == true) {
                        json.put("details", "");
                    } else {
                        json.put("details", "DB Initialization Failed");
                    }
                }
                return Response.ok(json.toString()).build();
```

*FIG. 12*

```
import javax.servlet.http.HttpServletRequest;
import javax.servlet.http.HttpServletResponse;
import javax.ws.rs.core.Context;
import migration.DB_Check;
import org.json.JSONException;
import org.json.JSONObject;
import org.json.XML;
import static org.mockito.Mockito.mock;
import static org.mockito.Mockito.when;

@Path("${api_path}")
@Api(value = "${api_path}", description = "")
@Produces({"application/json"})
public class ${api_name_caps} {

@Context
    HttpServletRequest request_main;
@GET
    @Path("${api_path}.json")
    public Response method(${parameters}) throws ServletException, IOException,
ClassNotFoundException, JSONException {
        ${calling_code_json}
    }

@GET
    @Path("${api_path}.xml")
    public Response method1(${parameters}) throws ServletException, IOException,
ClassNotFoundException, JSONException {
            ${calling_code_xml}
    }
}
```

1300 → (pointing to class declaration area)
1302 → (pointing to method body)

```
@Path("/loginservlet")
@Api(value = "/loginservlet", description = "API 1")
public class LoginServlet {

@Context
    HttpServletRequest request_main;

@GET
```
1402 →
```
    @Path("/loginservlet.json")
    @ApiOperation(value = "API 1", notes = "", responseClass = "{1}")
    @ApiErrors(value = {@ApiError(code = 404, reason = "API Not Found")})
    public Response method(@ApiParam(value = "Email ID", required = true) @QueryParam("email")
    String email,@ApiParam(value = "Password", required = true) @QueryParam("pass") String pass)
    throws ServletException, IOException, ClassNotFoundException, JSONException {
        StringWriter out = new StringWriter();
```
1404 →
```
        PrintWriter printOut = new PrintWriter(out);
        HttpServletResponse mockResponse = mock(HttpServletResponse.class);
        when(mockResponse.getWriter()).thenReturn(printOut);
request_main.setAttribute("email",email);
request_main.setAttribute("pass",pass);
loginRegister.loginServlet cn=new loginRegister.loginServlet();
request_main.getSession().setAttribute("query_result","failure");
cn.doPost(request_main, mockResponse);
DB_Check db = new DB_Check();
        JSONObject json = new JSONObject();

if (request_main.getSession().getAttribute("query_result").toString().equals("success")) {
            json.put("status", "OK");
            json.put("message", (String) request_main.getSession().getAttribute("query_result"));

} else {
            json.put("status", "ERROR");
            json.put("message", "failed");
            if (db.check_db() == true) {
                json.put("details", "");

} else {
                json.put("details", "DB Initialization Failed");
            }
        }
return Response.ok(json.toString()).build();
```
← 1406
```
    }
```

*FIG. 14*

```
//Code Inserted By Migration Tool
call.LineNumber(new
Throwable().getStackTrace()[0].getLineNumber(),this.getClass().getName());
```

Preprocess Project:
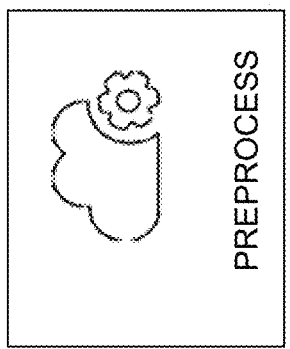
FIG. 28

Project Preprocessed

Manually run the project to harvest all the services

When completed, click here to continue

API's

| Category | Uniform Resource Locator | Test in Browser | Test in Swagger Interface |
|---|---|---|---|
| Servlet | /loginservlet/loginservlet.json?email=&pass= | Browser | Swagger |
| Servlet | /logoutservlet/_logoutservlet.json? | Browser | Swagger |
| JSP | /index/index.json | Browser | Swagger |
| JSP | /product/product.json?id= | Browser | Swagger |
| JSP | /userinfo/userinfo.json?uid= | Browser | Swagger |
| Mix | /mix/mix.json?id=&uid= | Browser | Swagger |
| New | /check/check.json?user=&pass=&token= | Browser | Swagger |

DOWNLOAD PACKAGE

INJECT INSTRUMENTATION CODE INTO AN EXISTING APPLICATION THAT IS TO BE CONVERTED TO A SERVICE-ORIENTED APPLICATION BY IDENTIFYING A CODE SIGNATURE WHERE A SERVICE OF SERVICES RELATED TO THE EXISTING APPLICATION IS INITIATED TO PREPROCESS AND INSTRUMENT THE EXISTING APPLICATION
3602

GENERATE TRACES RELATED TO A RUNTIME BEHAVIOR OF THE SERVICES RELATED TO THE EXISTING APPLICATION BY EXECUTING THE PREPROCESSED AND INSTRUMENTED EXISTING APPLICATION
3604

GENERATE CALLING CODE RELATED TO THE SERVICES RELATED TO THE EXISTING APPLICATION BY UTILIZING THE TRACES RELATED TO THE RUNTIME BEHAVIOR OF THE SERVICES RELATED TO THE EXISTING APPLICATION
3606

GENERATE REST APIs THAT INCLUDE THE CALLING CODE TO CALL THE SERVICES RELATED TO THE EXISTING APPLICATION
3608

GENERATE REFACTORED CODE FOR THE EXISTING APPLICATION FOR INVOCATION OF THE SERVICES RELATED TO THE EXISTING APPLICATION BY THE REST APIs
3610

*FIG. 36*

SERVICE EXTRACTION AND APPLICATION COMPOSITION

PRIORITY

This application claims priority to Indian Patent Application Number 4230/CHE/2014, filed Aug. 29, 2014, entitled "Service Extraction And Application Composition", which is incorporated by reference in its entirety.

BACKGROUND

Applications typically include an n-tier architecture that provides a model by which developers create flexible and reusable applications. For example, by segregating an application into tiers, when the application is to be modified, a specific layer of the application is typically modified or added, instead of reworking of the entire application. A variety of techniques are used to extract services from applications. A service represents a function that is performed by an application. For example, for an e-commerce application (e.g., an online bookstore application) a service includes login functionality that is performed by the application.

BRIEF DESCRIPTION OF DRAWINGS

Features of the present disclosure are illustrated by way of examples shown in the following figures. In the following figures, like numerals indicate like elements, in which:

FIG. 4 illustrates a partial snippet of existing code as an example of login functionality for an existing application, according to an example of the present disclosure;

FIG. 5 illustrates a partial snippet of JavaServer Pages (JSP) that host login functionality for an existing application, according to an example of the present disclosure;

FIG. 6 illustrates code signatures for servlet applications, according to an example of the present disclosure;

FIG. 7 illustrates code signatures for JSP pages, according to an example of the present disclosure;

FIG. 8 illustrates examples of instrumented code with respect to servlet applications that is injected into an existing application, according to an example of the present disclosure;

FIG. 9 illustrates examples of instrumented code with respect to JSP pages that is injected into an existing application, according to an example of the present disclosure;

FIG. 10 illustrates a Structured Query Language (SQL) query to generate a table for servlet applications, according to an example of the present disclosure;

FIG. 11 illustrates code for creating a table for storing information from JSP pages, according to an example of the present disclosure;

FIG. 12 illustrates portions of calling code that is generated for a login servlet, according to an example of the present disclosure;

FIG. 13 illustrates an example of a REST API code template, according to an example of the present disclosure;

FIG. 14 illustrates REST API code snippet for a login servlet, according to an example of the present disclosure;

FIG. 15 illustrates refactored code, according to an example of the present disclosure;

FIGS. 21-24 illustrate user interface screen-shots for the rapid service composition of FIG. 16, according to an example of the present disclosure;

FIGS. 25-34 illustrate user interface screen-shots for generation of a service-oriented application based on an existing application for the service extraction and application composition system of FIG. 1, according to an example of the present disclosure;

FIG. 36 illustrates further details of the method for service extraction and application composition, according to an example of the present disclosure.

DETAILED DESCRIPTION

Figure 1:
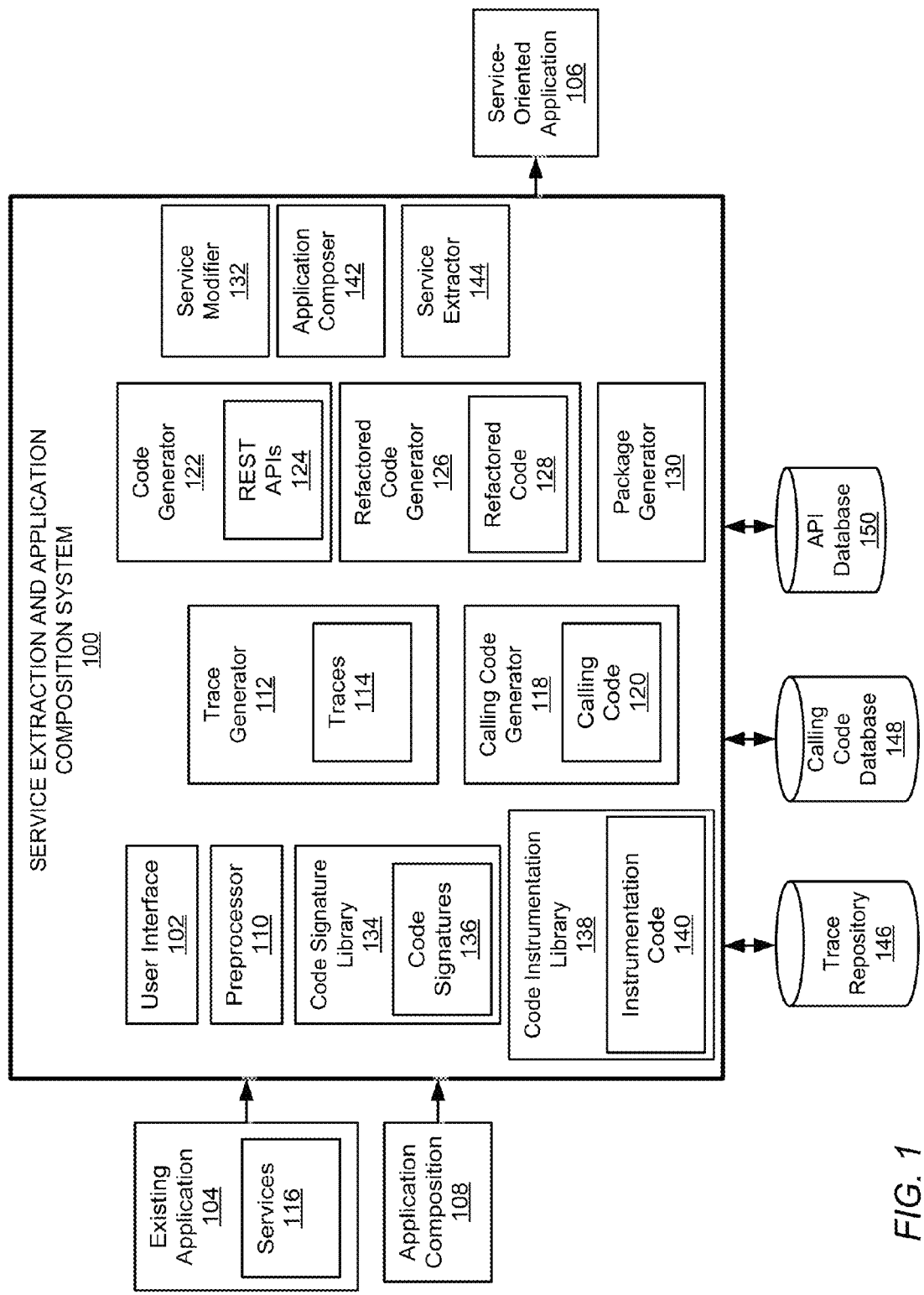
FIG. 1 illustrates a detailed architecture of a service extraction and application composition system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A variety of applications exist for performance of services. For such applications that do not include a service-oriented design, it is challenging to extract services to renew these applications to a service-oriented design and implementation. For example, applications that do not include a service-oriented design typically include monolithic functionality implemented in the application code. Such applications also do not typically include a modular design. Instead, modern applications are typically built by using a service-oriented approach in order to provide for the leveraging of core services across applications. A service-oriented approach may be described as an approach that employs representational state transfer (REST) services that are invoked by a REST uniform resource locator (URL) (e.g., from a browser, or a client application) to invoke the functionality of an application. Thus a service-oriented application may be described as an application that exposes functionality though REST services. The REST services are reusable functional components that are used to create application functionality. A REST service may represent the functionality that is invoked as part of a REST application programming interface (API) call. The REST API may include a URL, and the types of parameters and values that are passed from the URL to the REST service such that the REST service performs the function that is intended. The service-orientation for an application facilitates integrating with third-party services such a map API to create more complex applications. With the advent of mobility as a driver in enterprise information technology (IT), service-orientation provides for the development of mobile applications and application based on services.

In order to extract services from typical n-tier applications and applications generally, the services may be manually extracted and represented in a canonical format. This approach to the extraction of services from applications is typically based on expertise that is needed to extract services. The services may also be extracted by static code analysis that is used to extract features from the application code that are then mapped to services. A feature may be described as a type of code element that is being processed (e.g., a class, method, Structured Query Language (SQL) query, etc.), the types of attributes and values that are passed to the code element, and final details of the code element. Static code analysis techniques may also be used to transform code into an intermediate representation that is then analyzed to extract and represent services. Such static code analysis techniques can result in extraction of features that are not representative of the run time nature of the flow through the application code, with the features and resulting analysis thus yielding irrelevant services.

In order to address at least the foregoing aspects related to extraction of services from applications, according to examples disclosed herein, a service extraction and application composition system and a method for service extraction and application composition are disclosed herein. Extraction of services as disclosed herein may be described as the identification and/or retrieval of service for existing applications. Generally, the system and method disclosed herein provide for implementation of a service-oriented architecture (i.e., for a service-oriented application) based on an existing application, service composition and service integration to create new services and/or modify existing services, prototyping of a new service-oriented application with respect to any platform type, and service endpoint and prototype application composition. According to an example, the existing application is a typical n-tier legacy application that does not include a service-oriented architecture. With respect to implementation of a service-oriented architecture based on an existing application, the system and method disclosed herein provide for the conversion of existing applications to an intermediate format (i.e., REST based APIs as disclosed herein). The REST based APIs may represent an abstraction of the architecture of the World Wide Web (WWW). REST may represent an architectural style including a coordinated set of architectural constraints applied to components, connectors, and data elements, within a distributed hypermedia system. REST may disregard the details of component implementation and protocol syntax in order to focus on the roles of components, the constraints upon their interaction with other components, and their interpretation of significant data elements. Information extracted from the existing application may be used to migrate the existing application to a service-oriented architecture. With respect to prototyping of a new service-oriented application with respect to any platform type, the system and method disclosed herein provide for the use of REST based APIs for prototyping a new application on any existing platform which supports web service calls.

According to an example, the system and method disclosed herein provide for the extraction of services from existing applications, such as legacy applications, documentation, refinement of services, and generation of a deployable service-based application for prototyping. An example of a legacy application is an e-commerce application (e.g., an online bookstore application). The services that are extracted from the existing application may include REST web-services. An example of a service that is extracted includes login functionality that is performed by the existing application and implemented as servlet, or by JSP pages that host functionality. Other examples of services that may be extracted for the e-commerce application include logout functionality, indexing of products, product details, user information, etc. For an e-commerce application, REST web-services may include user registration, product search based on product identification (ID), etc. The system and method disclosed herein may include a library of analysis techniques (e.g., based on a code signature library as disclosed herein) that are applied to different types of applications. Code analysis may be performed for instrumentation, feature extraction, and feature representation. A user interface (UI) may be used to view results of the code analysis, for documentation, and for refinement. The system and method disclosed herein may be used to generate a REST service-oriented prototype application that provides the functionality of a legacy application through a service interface. The system and method disclosed herein also provide for the definition of services (e.g., by using a service modifier as disclosed herein), and the generation of a skeleton service-based application. The prototype application and/or the skeleton service-based application that are generated may be packaged for deployment on a local system, or the Cloud. The system and method disclosed herein further provide for the addition of functionality to an existing application (e.g., based on the addition of services to an existing application by using a service modifier (i.e., an authoring interface as disclosed herein).

The service extraction and application composition system and the method for service extraction and application composition disclosed herein provide a technical solution to technical problems related, for example, to extraction of services from typical n-tier applications, and applications generally. The system and method disclosed herein provide the technical solution of preprocessing and instrumenting an existing application that is to be converted to a service-oriented application. The existing application may be executed to generate traces related to a runtime behavior of services related to the existing application. The traces may be used to generate calling code related to the services related to the existing application. REST APIs that include the calling code to call the services related to the existing application may be generated. Refactored code for the existing application may be generated for invocation of the services related to the existing application by the REST APIs. A prototype application generated by the system and method disclosed herein thus provides for improvement in resource utilization by removing inconsistencies with applications that are generated and/or services that are ascertained with other techniques. In order to provide for further improvements in resource utilization and application features, new services may be added to the extracted services. Further, in order to provide for further improvements in resource utilization and application features, a new application may be generated based entirely on services that are specified, as opposed to extracted from an existing application.

FIG. 1 illustrates a detailed architecture of a service extraction and application composition system 100, according to an example of the present disclosure. The system 100 may include a user interface 102 that is to receive information related to a type of an existing application 104 that is to be converted to a service-oriented application 106. The user interface 102 may also receive information related to application composition 108 for composing the service-oriented application 106, with or without the use of the existing application 104. A preprocessor 110 is to preprocess and instrument the existing application 104 that is to be converted to the service-oriented application 106. A trace generator 112 is to execute the preprocessed and instrumented existing application 104 to generate traces 114 related to a runtime behavior of services 116 related to the existing application 104. A calling code generator 118 is to utilize the traces 114 related to the runtime behavior of the services 116 related to the existing application 104 to generate calling code 120 related to the services 116 related to the existing application 104. A code generator 122 is to generate representational state transfer REST APIs 124 that include the calling code 120 to call the services 116 related to the existing application 104. A refactored code generator 126 is to generate refactored code 128 for the existing application 104 for invocation of the services 116 related to the existing application 104 by the REST APIs 124. A package generator 130 is to utilize the REST APIs 124 and the refactored code 128 for the existing application 104 to generate the service-oriented application 106. A service modifier 132 is to add, delete, and/or modify the services 116 related to the existing application 104, and add, delete, and/or modify services during new application composition. A code signature library 134 may include a plurality of code signatures 136 that are specific to a type of the existing application 104. A code instrumentation library 138 may include instrumentation code 140 to for extraction of functionality of the existing application 104. An application composer 142 is to receive requirement information (e.g., the application composition 108) for the service-oriented application 106 that is to be generated. A service extractor 144 may generate a display of the extracted services 116 from the existing application 104. For example, for an e-commerce application, the service extractor 144 may generate a display including logout functionality, indexing of products, product details, user information, etc. The traces 114, calling code 120, and APIs related to the addition, deletion, and/or modification of services by the service modifier 132 may be respectively stored in a trace repository 146, a calling code database 148, and an API database 150.

As described herein, the elements of the service extraction and application composition system 100 may be machine readable instructions stored on a non-transitory computer readable medium. In addition, or alternatively, the elements of the service extraction and application composition system 100 may be hardware or a combination of machine readable instructions and hardware.

Figure 2:
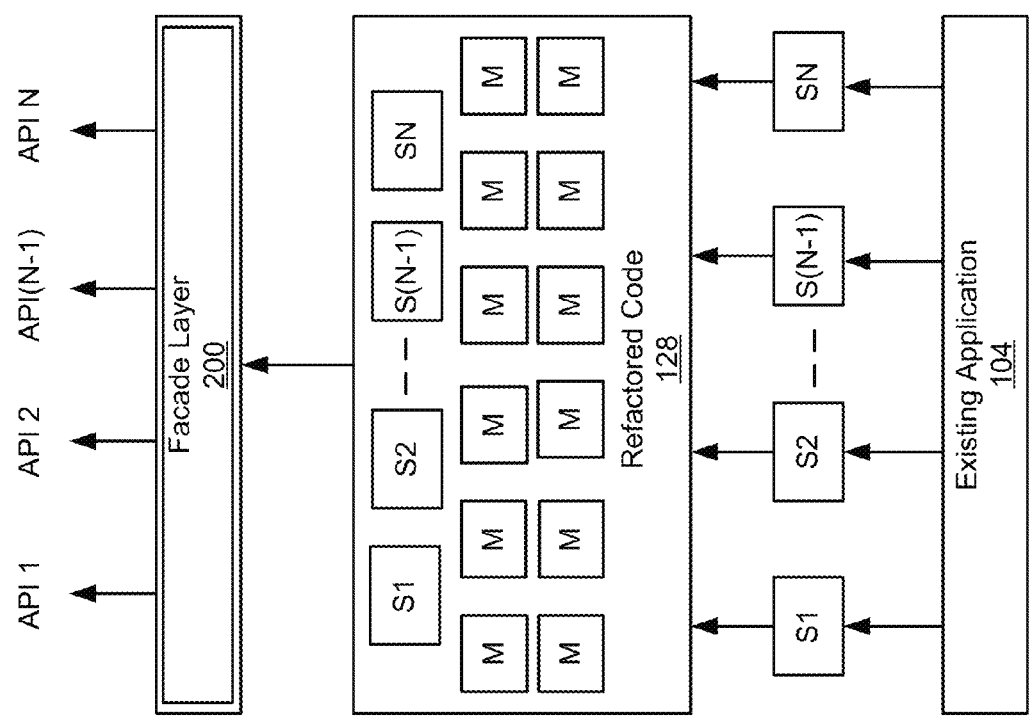
FIG. 2 illustrates building of a three tier architecture over an existing application for the service extraction and application composition system, according to an example of the present disclosure.

FIG. 2 illustrates generation of a three-tier architecture over an existing application for the service extraction and application composition system 100, according to an example of the present disclosure. As described herein with reference to FIGS. 2 and 3, the existing application 104 may be refactored and wrapped inside a facade layer 200 to thus expose the REST APIs for the services of the existing application 104. The existing application 104 may contain the entire source code package, test cases to test the existing application 104, and a running environment where the existing application 104 may be executed.

The extracted services 116 may be represented as S1, S2, . . . , S(N−1), SN.

With respect to the refactored code 128, after extracting the services 116 from the existing application 104, the source code of the existing application 104 may be modified for access by the REST APIs 124. The REST APIs 124 may each include the calling code 120 (i.e., code from the calling code 120) to call respective ones of the services 116. The refactored code 128 may perform an assigned task that is performed by the respective services 116 of the existing application 104. The response for each assigned task may be stored in a JSON.XML format, and reverted to the REST APIs 124. The refactored code 128 may include the modified code and non-modified model classes that are called internally by the services 116. The code elements of the existing application 104 that are invoked in the calling code 120 may be represented as M.

With respect to the facade layer 200, the refactored code 128 may be wrapped in the facade layer 200. The facade layer 200 may include the REST APIs 124, and expose the REST APIs 124 to a client. The facade layer 200 may hide the internal complexities of the existing application 104, and provide a REST based interface. These exposed REST APIs 124 may be used to prototype a replica of the existing application 104 or to generate the service-oriented application 106.

Figure 3:
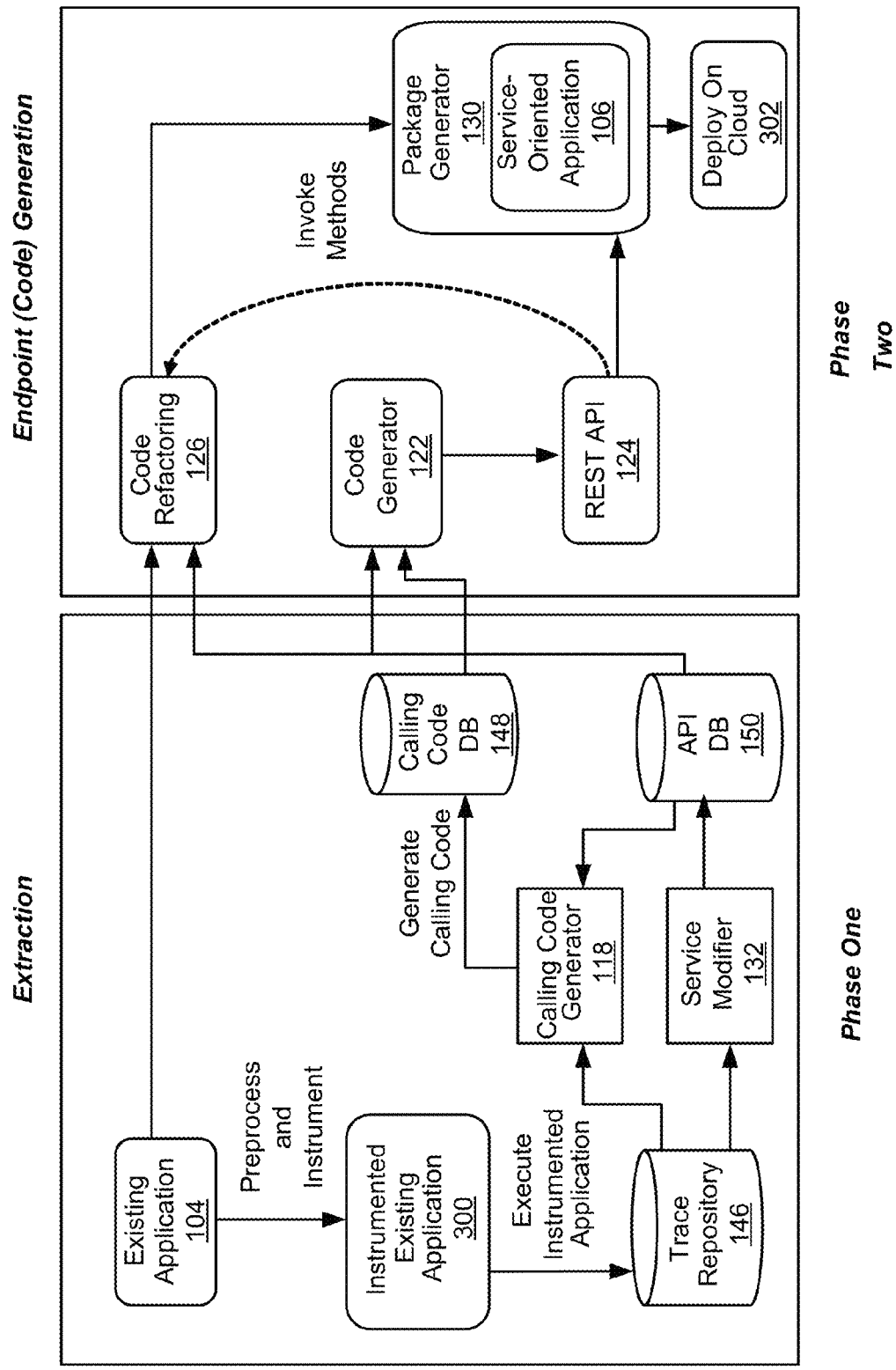
FIG. 3 illustrates a logic-flow of service extraction and application code generation for an existing application, according to an example of the present disclosure.

FIG. 3 illustrates service extraction and application code generation for the service extraction and application composition system, according to an example of the present disclosure. Referring to FIG. 3, initially the existing application 104 that is to be converted to the service-oriented application 106 may be preprocessed and instrumented by the preprocessor 110 to generate an instrumented existing application 300. FIG. 4 illustrates a partial snippet of the existing code 400 as an example of login functionality for an existing application 104 that is implemented as an online bookstore application, where the login functionality is implemented as a servlet application. Similarly, FIG. 5 illustrates a partial snippet of JSP pages that host login functionality for an existing application 104 that is implemented as an online bookstore application. The preprocessing and instrumentation by the preprocessor 110 may include scanning of the existing application 104 (e.g., to identify methods and calls) to identify a subset of the existing application code for analysis, and injection of the instrumentation code 140 into the existing application 104. For example, in order to preprocess and instrument the existing application 104, in the case of a JAVA based existing application 104 or an existing application 104 generally, code signatures 136 from the code signature library 134 may be identified. The code signature library 134 may include different types of code signatures based on the particular type of the existing application 104 (e.g., JAVA, C, etc.). The type of the existing application 104 may be determined by the preprocessor 110, or entered by a user via the user interface 102. The code signatures 136 may represent code points where a service is initiated. For example, for servlet applications, the code signatures 136 may include a particular type of class and method signature. For the example of FIG. 4, referring to FIG. 6, for servlet applications, the code signatures 136 may include doGet( . . . ), doPost( . . . ). For the example of FIG. 5, referring to FIG. 7, for JSP pages, the code signatures 136 are of type "Statement XYZ=connection.getStatement( ) // where connection is an object of Type java.sql.Connection," and // followed by an execute query method "XYZ.executeQuery( . . . )".

With the use of codepoint inserters, the existing application code (i.e., code for the existing application 104) may be preprocessed by scanning for the code signatures 136, and instrumented by the use of the instrumentation code 140 that is injected at appropriate locations to extract the functionality of the existing application 104. The instrumentation code 140 that is specific to the type of the existing application 104 may be stored in the code instrumentation library 138. The existing application 104 may be rebuilt along with the instrumented code 140. Generally, the instrumented code 140 may include a data structure that holds the data that is edited, code that is related to the features of the core elements (e.g., methods, calls, etc.) of the existing application 104, and code that extracts the needed values from the running code of the existing application 104.

For the examples of FIGS. 4 and 6, referring to FIG. 8, with respect to servlet applications, examples of the instrumented code that is injected into the existing application 104 may include "migration.RequestToCSV call=new migration.RequestToCSV( ); call.insert_servlet(request,this.getClass( ).getName( ), Thread.currentThread( ).getStackTrace( )[1].getMethodName( ))." For the examples of FIGS. 5 and 7, referring to FIG. 9, with respect to JSP pages, examples of the instrumented code that is injected into the existing application 104 may include "<% migration.RequestToCSV call=new migration.RequestToCSV( ); call.insert_jsp(request,this.getClass( ).getSimpleSQLQuery( )); %>." Based on the injection of the instrumented code 140 into the existing application 104, existing application information may be obtained from the existing application 104 as described herein with respect to the traces 114.

The instrumented existing application 300 (i.e., the existing application 104 that includes the instrumented code 140) may be executed to generate the traces 114 that are stored in the trace repository 146. Based on the execution of the instrumented existing application 300, the trace repository information (i.e., the traces 114) may be based the runtime behavior of the services 116 related to the existing application 104. The trace repository 146 may include different types of trace repository information related, for example, to servlet applications, JSP pages, etc. For the examples of FIGS. 4, 6, and 8, the Structured Query Language (SQL) query to generate a table for servlet applications is illustrated in FIG. 10. Similarly, for the examples of FIGS. 5, 7, and 9, the code for creating the table for storing information from JSP pages is illustrated in FIG. 11. The trace repository 146 may include the traces 114 that are related to parameters and values that are extracted from the code of the existing application 104, REST service definitions, interface code that is generated for interfacing the REST service that is created and the functionality of the existing application 104, and a location of the instrumentation of the existing application 104 (e.g., for fault detection). Examples of the traces 114 related to the parameters and values that are extracted from the code of the existing application 104 include a username and a value for the username that is received, a password and a value for the password that is received, etc. Examples of the traces 114 related to the REST service definitions include the REST service ID, REST service name, URL path that is invoked by a user, and a description of a particular REST service. The traces 114 may also include information related to methods that are invoked by the existing application 114, and information related to any type of data flow related to a method that is invoked.

The calling code generator 118 may utilize the trace repository information to generate the calling code 120. The calling code 120 may include a data structure that accepts incoming parameter and value pairs that are part of a REST service call, an existing application invocation code for invoking an appropriate part of the existing application 104 that is related to the REST API invoked by a user, a data structure that accepts a response from the existing application 104, and converts the response to a JSON or XML format for returning to a user. For example, the calling code generator 118 may generate the calling code for each service in the trace repository 146, which may then be used by the JAVA API for Restful Web Service (JAX-RS) APIs to invoke refactored legacy services. The calling code 120 may be stored in the calling code database 148. The calling code 120 may be used in service stubs to call related services in the existing application 104 to create a facade layer over the existing application 104 as described with reference to FIG. 2. The facade layer that is consumed by the service-oriented application 106 is service based and allows for rapid reuse of the functionality of the existing application 104 through modern services. For the examples of FIGS. 4, 6, 8, and 10, portions of calling code that is generated for the login servlet is illustrated in FIG. 12. For the example of FIG. 12, lines 1200 link the login service to the existing application 104. For different service APIs, the attributes and the servlet object reference may change.

The code generator 122 may utilize the calling code 120 from the calling code database 148 to generate (i.e., code) the REST APIs 124. A REST API may include a method that is invoked when a REST service call is invoked. An appropriate calling code from the calling code database 148 may be embedded in a REST API. The code generator 122 may generate a class and method for a REST API that is to be executed, and further embed the appropriate calling code as part of the REST API. Examples of the REST services include web services. The REST APIs 124 may be used to call the existing application 104 via the calling code 120. The calling code 120 may thus form a bridge between the REST APIs 124 and the existing application 104. The calling code 120 may be bundled in the code of the REST APIs 124. FIG. 13 illustrates an example of a REST API code template. For the REST APIs 124, as shown at 1300 and 1302, annotated parameters may be replaced with actual data from the calling code database 148. For the examples of FIGS. 4, 6, 8, 10, and 12, a REST API code snippet for the login servlet is illustrated in FIG. 14 at 1400, with the parameter values shown at 1402, and calling code 120 shown at 1404. The REST API may return the JavaScript Object Notation (JSON) output as shown at 1406.

The REST APIs 124 may be used by the package generator 130 to deploy the service-oriented application 106. For example, the REST APIs 124 may be used by the package generator 130 to deploy the service-oriented application 106 on the Cloud at 302 (see FIG. 3), or downloaded and locally deployed by a user. The package generator 130 may also package the refactored existing application with the REST APIs 124.

With respect to rapid service composition, the service modifier 132 may be used to add, delete, and/or modify services for the existing application 104. For example, with respect to modification of services, any information for existing services may be modified to upgrade the existing services and/or for matching with a change requirement. Any services that are added, deleted, and/or modified based on the service modifier 132 may be stored in the API database 150 and further processed by the calling code generator 118 and the code generator 122. The API database 150 may include the API details, such as, for example, API name, path, value, etc. The REST APIs 124 with respect to the services generated based on the service modifier 132 may be similarly packaged by the package generator 130 and deployed, for example, on the Cloud at 302. The package generator 130 may also generate the package based on the type of Cloud.

The service modifier 132 may be used to modify a service granularity with respect to the existing application 104. For example, an e-commerce application may include an API related to products that are available. In this regard, the service modifier 132 may be used to modify the API of the e-commerce application to provide details of products that are available in a specified zip code, or during a specified time period. The API for an application may also be broken down into different conditions to add modularity.

Generally, the refactored code generator 122 may add new code to the existing application code so that a service of the existing application 104 is invoked by the calling code of the REST API (i.e., coupled to the REST APIs 124), as opposed to direct invocation by a user. The refactored code generator 122 may also add new code to the existing application code to retrieve contextual information related to any failures. For example, the refactored code generator 122 may retrieve the line number and the class where a failure occurs. The line number and the class where a failure occurs may be used to debug the REST APIs 124. An example of the refactored code 128 is shown in FIG. 15.

With respect to quick prototyping, once the services of the existing application 104 are exposed in form of the REST APIs 124 and are accessible to authorized users, the REST APIs 124 may be transformed into frontend applications at a client platform. For example, the exposed services may be used to develop the required service-oriented application 106. Alternatively or additionally, a prototyping tool may receive as input the exposed services and generate frontends for a particular platform.

Figure 16:
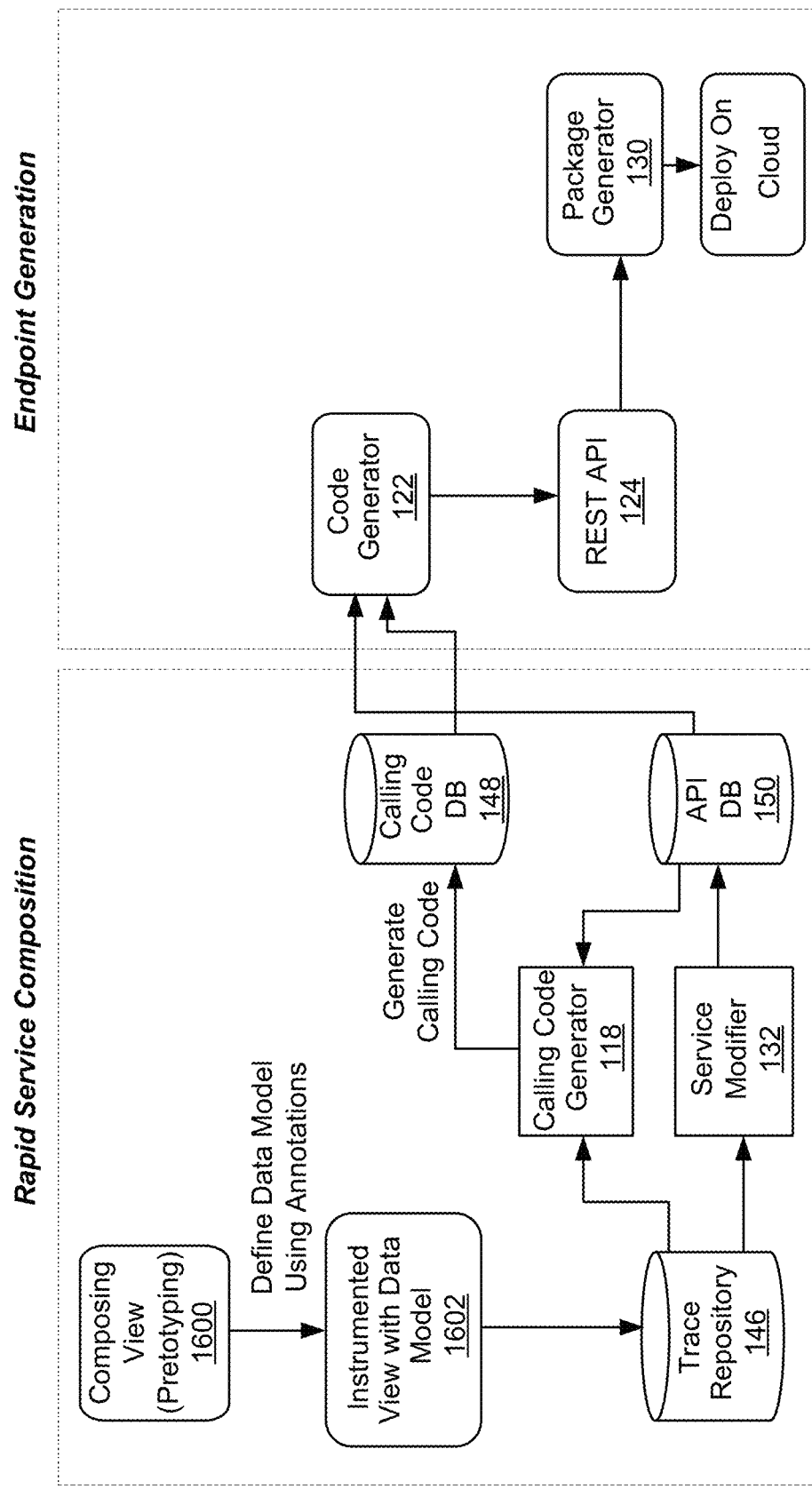
FIG. 16 illustrates rapid service composition for the service extraction and application composition system, according to an example of the present disclosure.

FIG. 16 illustrates rapid service composition for the service extraction and application composition system, according to an example of the present disclosure. With respect to rapid service composition, service endpoints may be composed (e.g., at 1600) and a prototype mobile application (e.g., the service-oriented application 106) may be generated from a requirements document and service end points metadata information.

Figure 17:
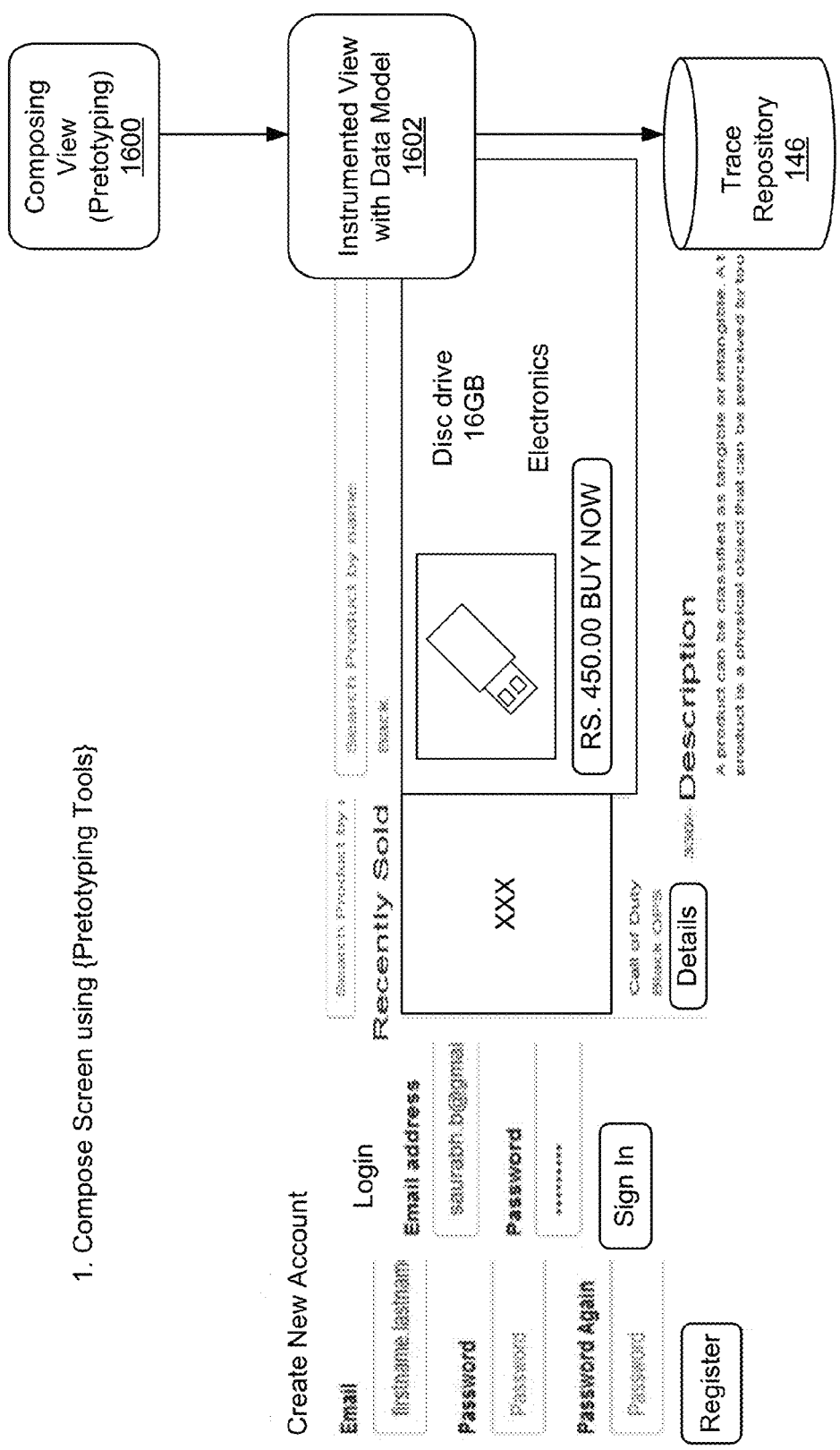
FIG. 17 illustrates compose screens using pretotyping tools for the rapid service composition of FIG. 16, according to an example of the present disclosure.

FIG. 17 illustrates compose screens using pretotyping tools, according to an example of the present disclosure. Referring to FIGS. 16 and 17, in order to compose a service-oriented application 106 based on specified services, the application composer 142 may utilize a pretotyping tool to create views of the service-oriented application 106 (e.g., at 1600 in FIG. 16). The application composer 142 may provide a visualization of the service-oriented application 106.

Figure 18:
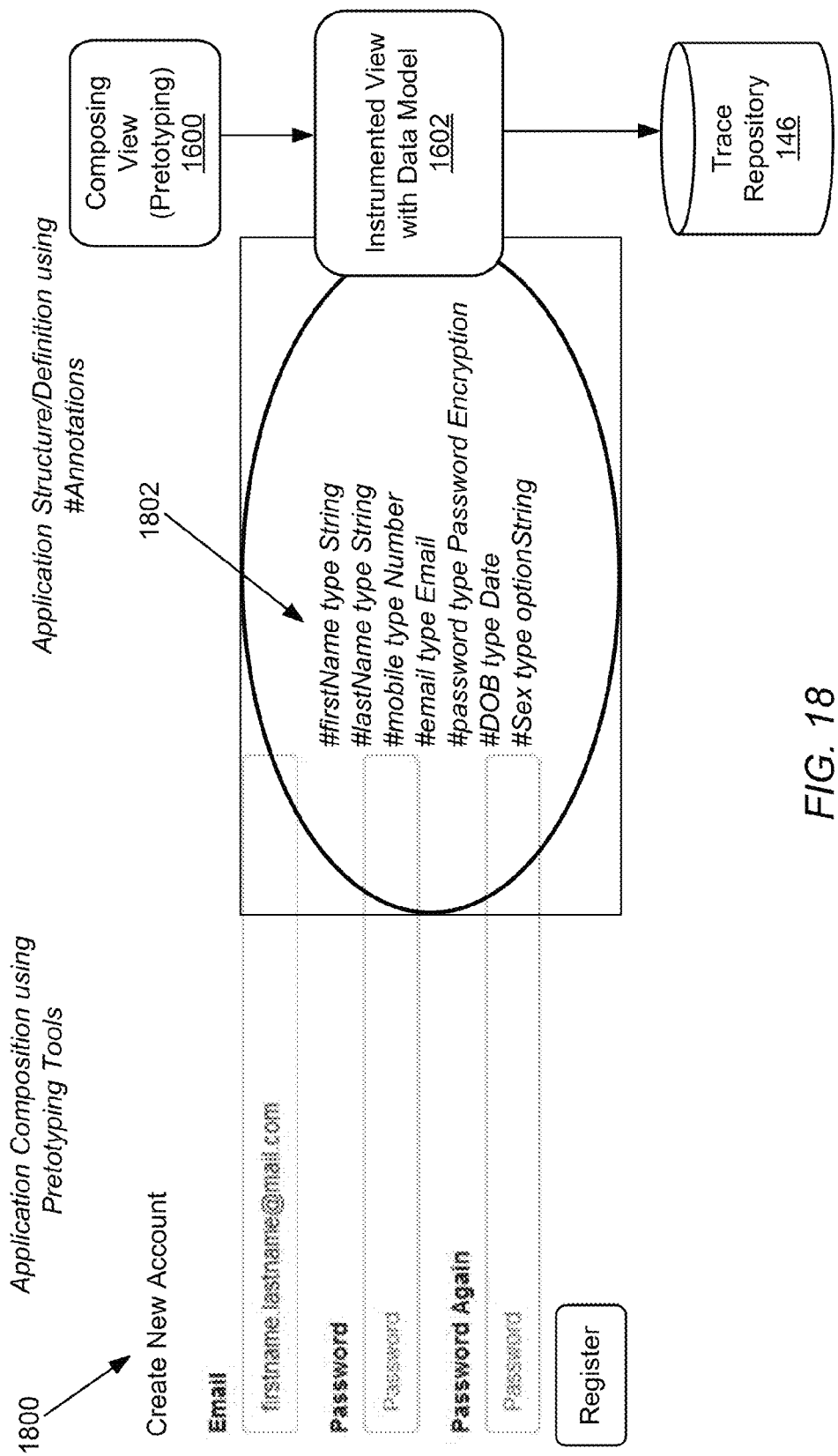
FIG. 18 illustrates application structure/definition using annotations for the rapid service composition of FIG. 16, according to an example of the present disclosure.

FIG. 18 illustrates application definition using annotations, according to an example of the present disclosure. Referring to FIG. 18, the data model for the service-oriented application 106 may be defined using annotations. The annotations specify what type of key/value pairs are passed between a user and an API for a prototype screen that has been created. For example, the instrumented view of FIG. 18 shows a create new account view at 1800 for the service-oriented application 106, and annotations 1802 based on the instrumented view of the service-oriented application 106. The annotations 1802 provide for the implementation of logic and intelligence in the create new account view 1800 for the service-oriented application 106. Examples of the annotations 1802 may include "#firstName type String", "#lastName type String", "#mobile type Number", "#email type Email", "#password type Password Encryption", "#DOB type Date", "#Sex type option String", etc.

The behavior of the service-oriented application 106 may be similarly stored in the trace repository 146. For example, referring to FIG. 16, the data model 1602 may be extracted and information related to the data model 1602 gathered inside the trace repository 146 may be used to generate the final service endpoints. The service-oriented application 106 may be generated using the calling code generator 118, and the code generator 122 to generate the REST APIs 124.

Figure 19:
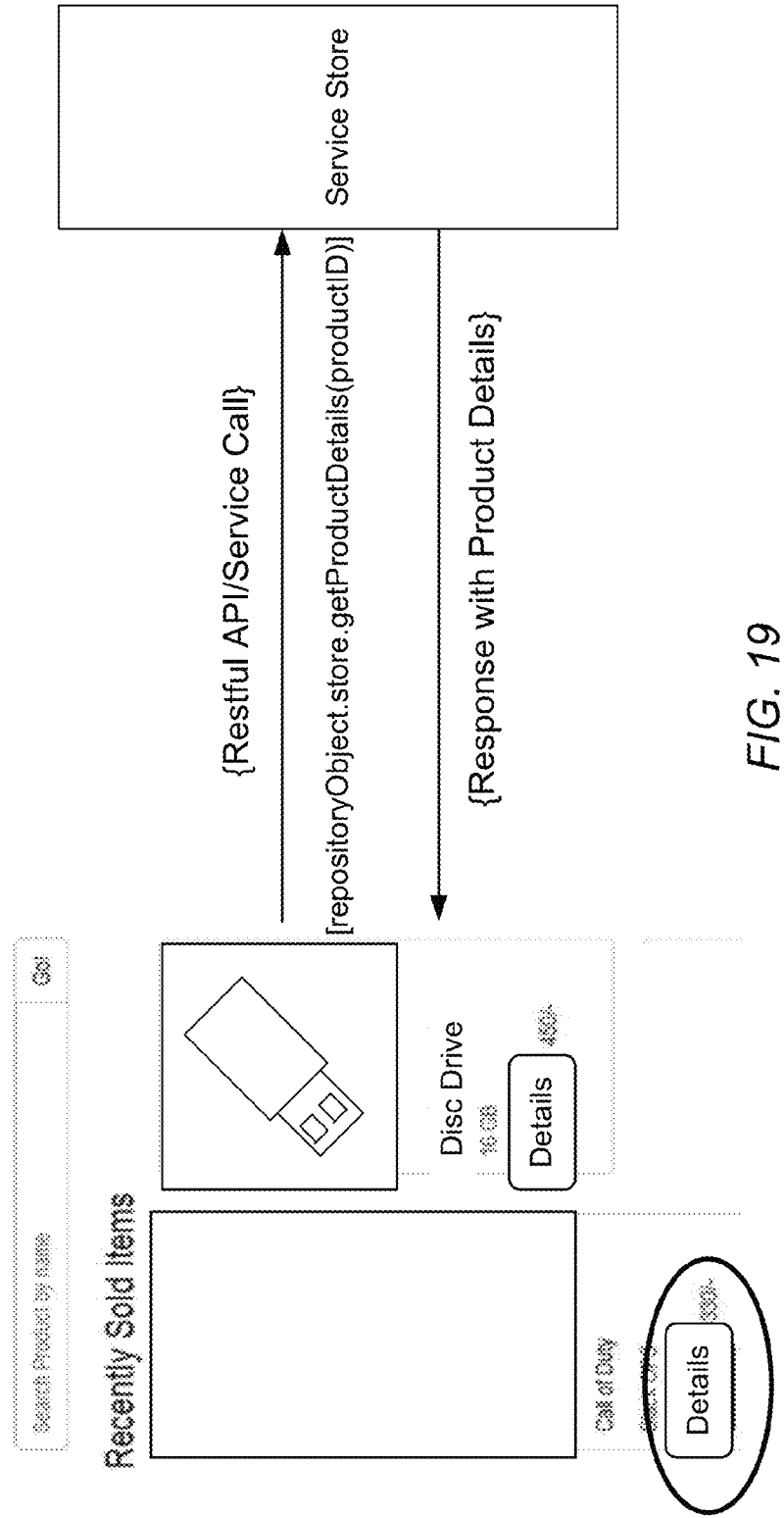
FIG. 19 illustrates REST API/service calls for the rapid service composition of FIG. 16, according to an example of the present disclosure.
Figure 20:
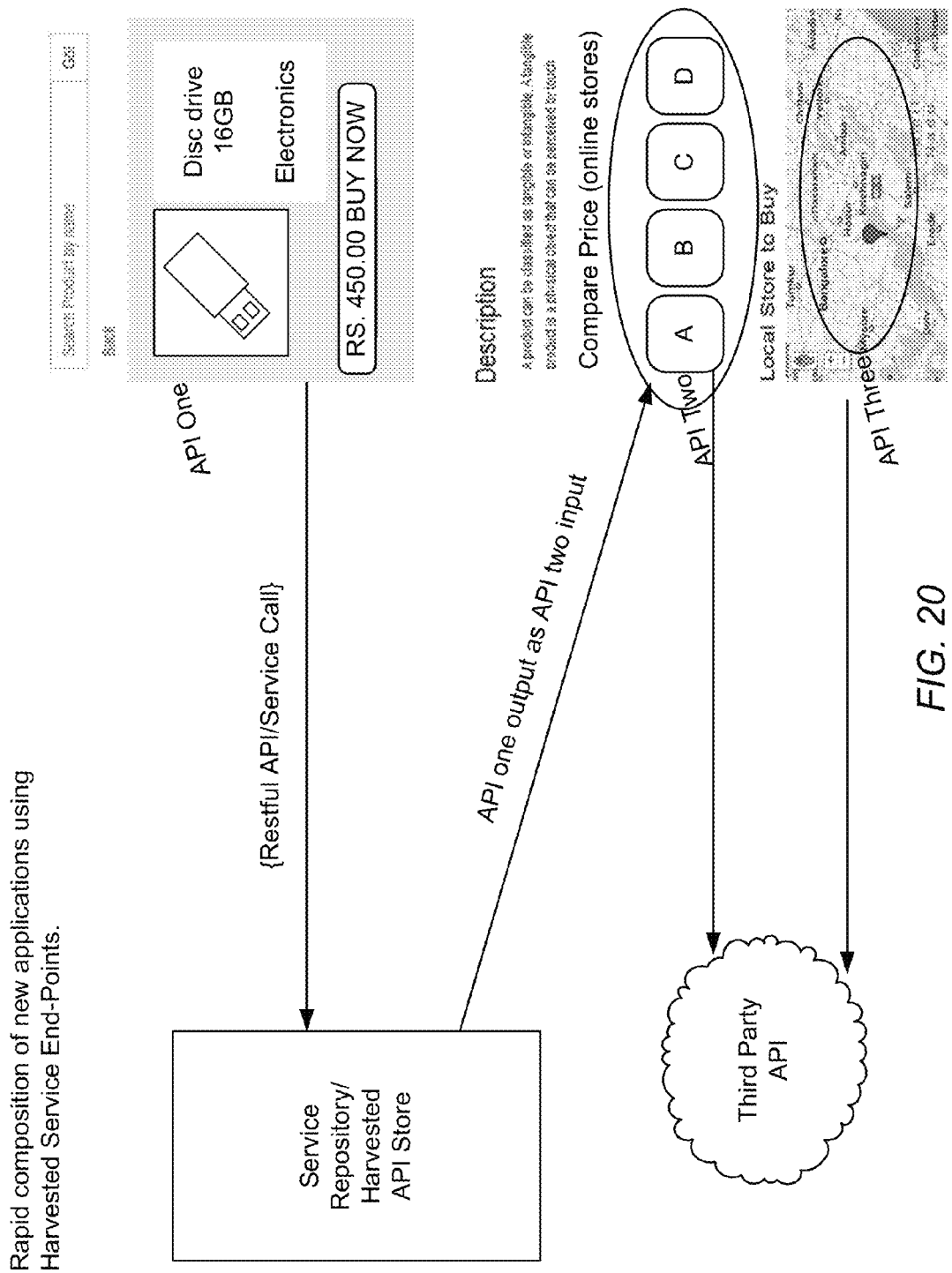
FIG. 20 illustrates REST API/service calls for the rapid service composition of FIG. 16, according to an example of the present disclosure.

Referring to FIGS. 19 and 20, the views of the service-oriented application 106 may be composed and the API may be called. The service-oriented application 106, that may be a mobile application or a web application, may be generated. The HTML developed using the pretotyping tool may be used as an input to compose the service-oriented application 106, and the service endpoints may be triggered using the service-oriented application 106.

Figure 21:
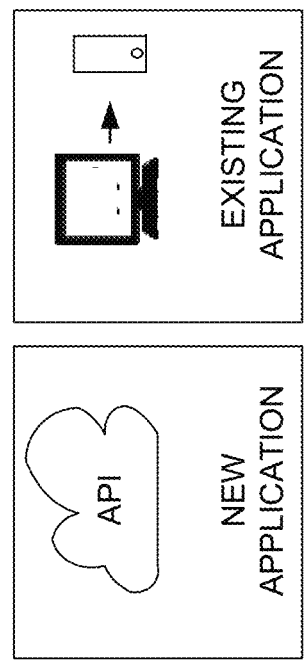
Figure 22:
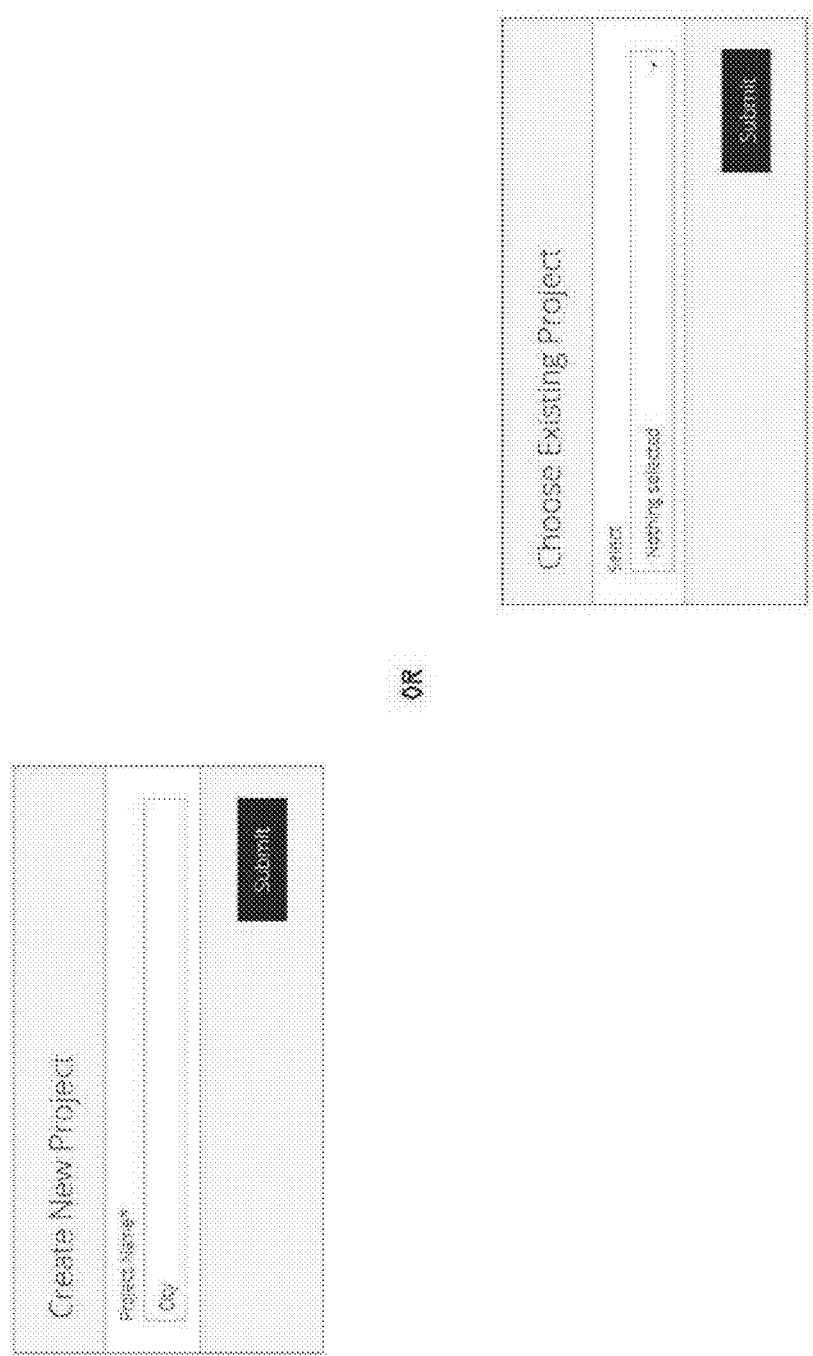
Figure 23:
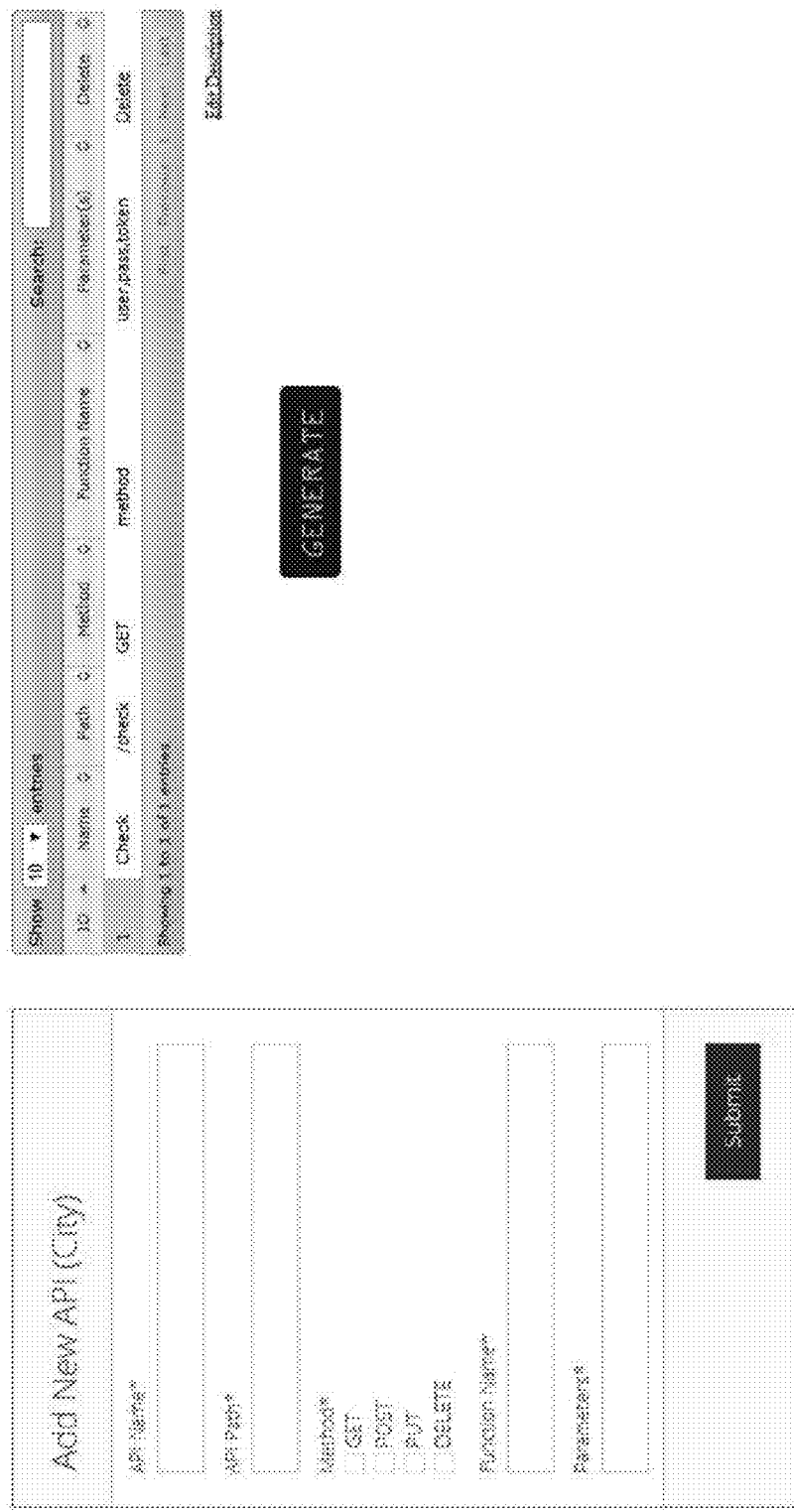

FIG. 21 illustrates user interface displays for creation of a new service-oriented application or for generation of a service-oriented application based on the existing application 104. Assuming the option to create a new service-oriented application is selected, referring to FIG. 22, a new project may be created by selecting "create new project", or a user may continue to work on an existing project by selecting "choose existing project". Referring to FIG. 23, a new API may be authored, for example, for the API database 150. Further, referring to FIG. 24, an API may be modified.

Figure 25:
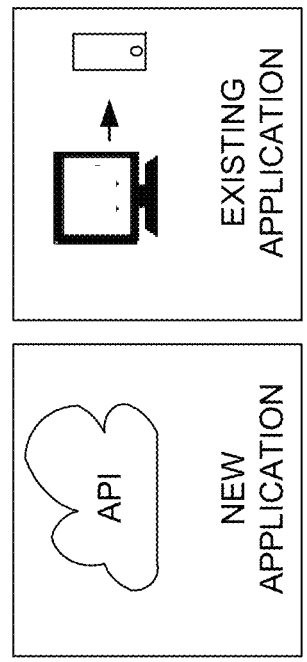
Figure 26:
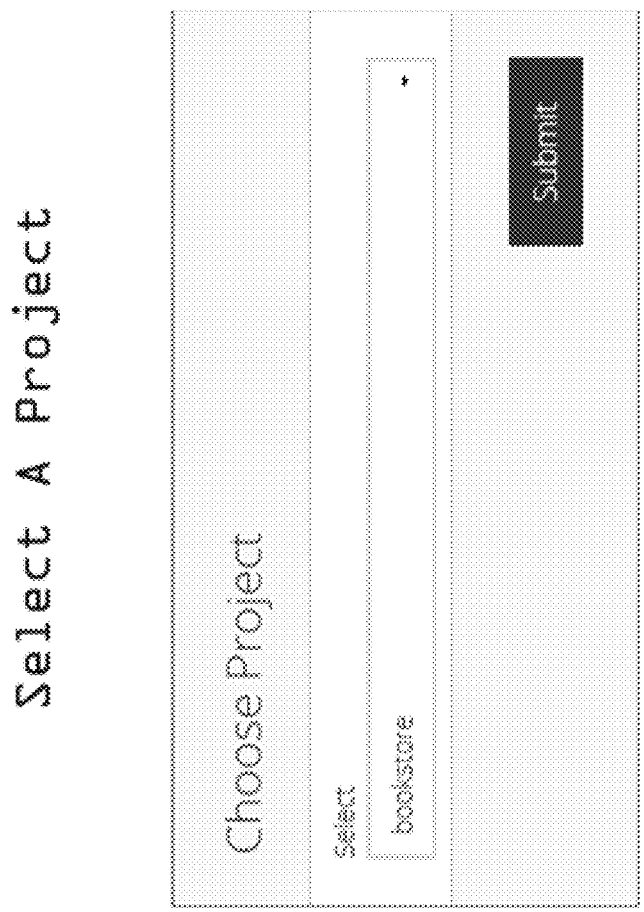
Figure 27:
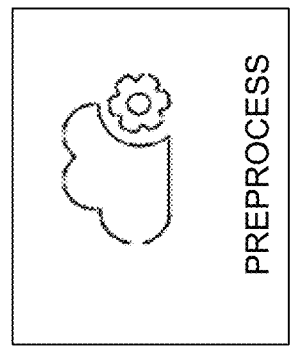
Figure 29:
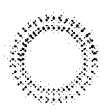
Figure 30:
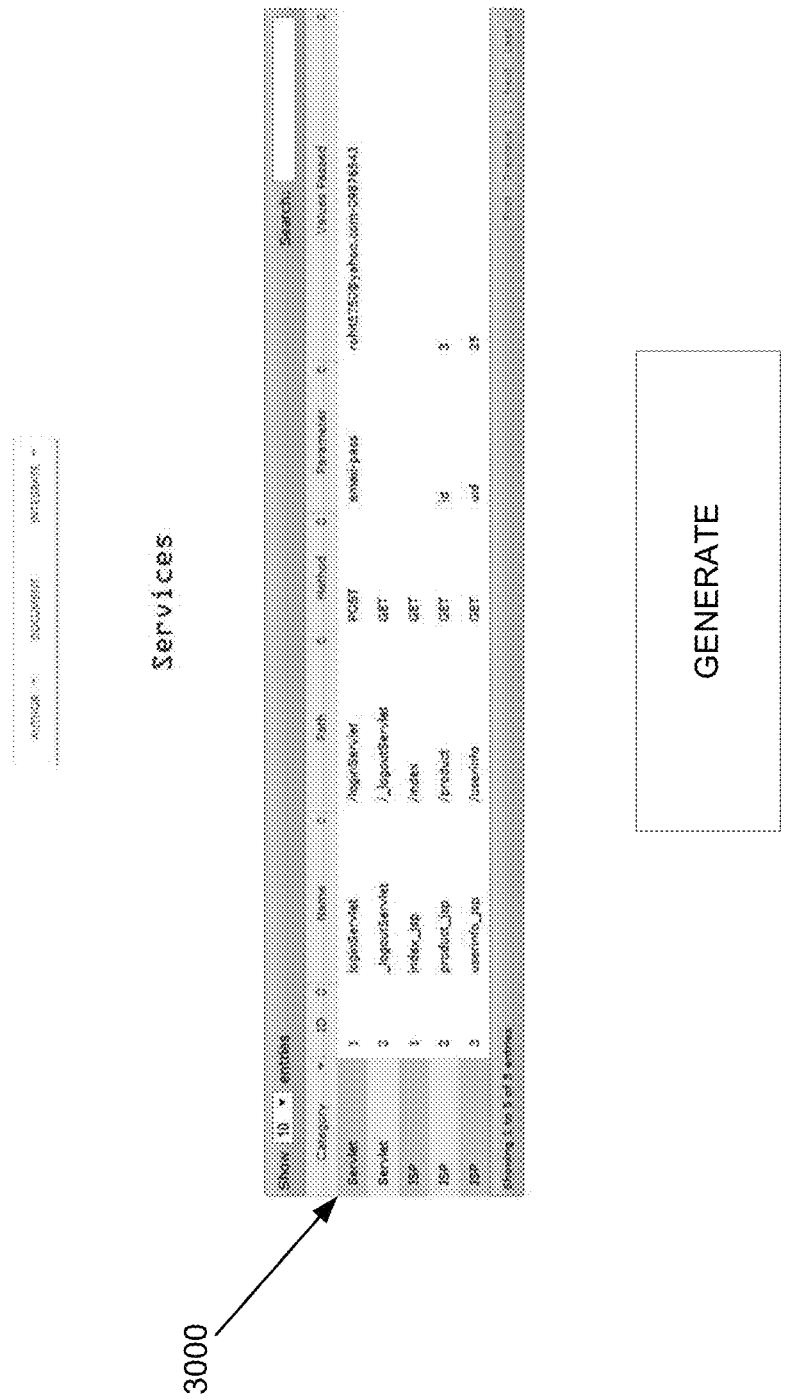
Figure 34:
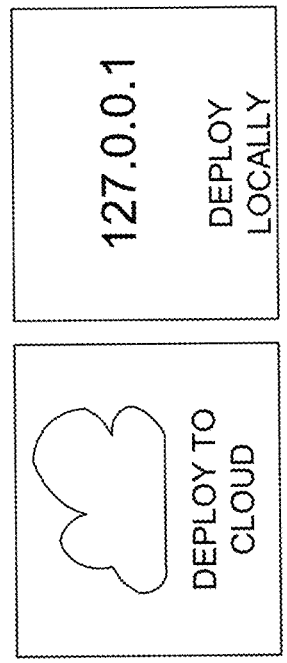

FIG. 25 illustrates user interface displays for creation of a new service-oriented application or for generation of a service-oriented application based on the existing application 104. Assuming the option to generate a service-oriented application based on the existing application 104 is selected, referring to FIG. 26, the existing application 104 may be selected. Referring to FIG. 29, the "project preprocessed" indication may indicate that the existing application 104 has been preprocessed. Referring to FIG. 30, the services of the existing application 104 may be displayed at 3000. Referring to FIG. 31, the service modifier 132 may be used to modify the services 116. Referring to FIG. 32, the services 116 may be displayed. Referring to FIG. 33, the REST APIs 124 may be displayed. Referring to FIG. 34, the package generator 130 may provide the option to deploy the package to the Cloud or for local download.

Figure 35:
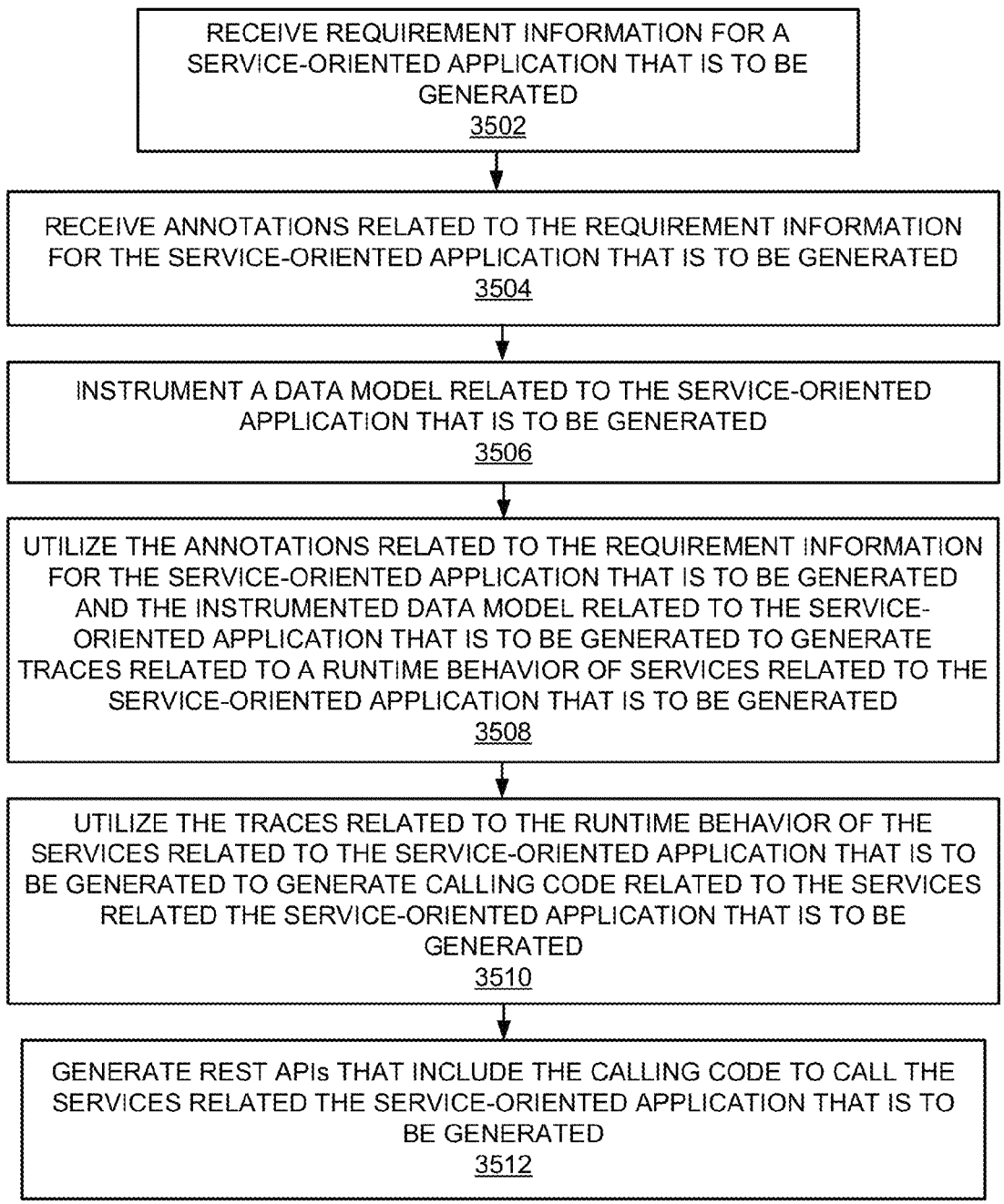
FIG. 35 illustrates a method for service extraction and application composition, according to an example of the present disclosure.

FIGS. 35 and 36 illustrate flowcharts of methods 700 and 800 for service extraction and application composition, according to examples. The methods 3500 and 3600 may be implemented on the service extraction and application composition system 100 described above with reference to FIGS. 1-34 by way of example and not limitation. The methods 3500 and 3600 may be practiced in other systems.

Referring to FIGS. 1, 16, and 35, at block 3502, the method 3500 may include receiving requirement information for a service-oriented application that is to be generated.

At block 3504, the method 3500 may include receiving annotations related to the requirement information for the service-oriented application that is to be generated.

At block 3506, the method 3500 may include instrumenting a data model related to the service-oriented application that is to be generated.

At block 3508, the method 3500 may include utilizing the annotations related to the requirement information for the service-oriented application that is to be generated and the instrumented data model related to the service-oriented application that is to be generated to generate traces related to a runtime behavior of services related to the service-oriented application that is to be generated.

At block 3510, the method 3500 may include utilizing the traces related to the runtime behavior of the services related to the service-oriented application that is to be generated to generate calling code related to the services related the service-oriented application that is to be generated.

At block 3512, the method 3500 may include generating REST APIs that include the calling code to call the services related the service-oriented application that is to be generated.

For the method 3500, receiving requirement information for a service-oriented application that is to be generated may further include utilizing pretotyping to receive the requirement information for the service-oriented application that is to be generated.

Referring to FIGS. 1, 3, and 36, at block 3602, the method 3600 may include injecting instrumentation code into an existing application that is to be converted to a service-oriented application by identifying a code signature where a service of services related to the existing application is initiated to preprocess and instrument the existing application.

At block 3604, the method 3600 may include generating traces related to a runtime behavior of the services related to the existing application by executing the preprocessed and instrumented existing application.

At block 3606, the method 3600 may include generating calling code related to the services related to the existing application by utilizing the traces related to the runtime behavior of the services related to the existing application.

At block 3608, the method 3600 may include generating REST APIs that include the calling code to call the services related to the existing application.

At block 3610, the method 3600 may include generating refactored code for the existing application for invocation of the services related to the existing application by the REST APIs.

According to an example, the method 3600 may include utilizing the REST APIs and the refactored code for the existing application to generate the service-oriented application.

According to an example, the method 3600 may include adding, deleting, and/or modifying the services related to the existing application.

According to an example, the method 3600 may include generating traces related parameters and values that are extracted from existing application code, and REST service definitions.

According to an example, the calling code may include an existing application invocation code for invoking a specified part of the existing application that is related to invocation of a REST API of the REST APIs.

Figure 37:
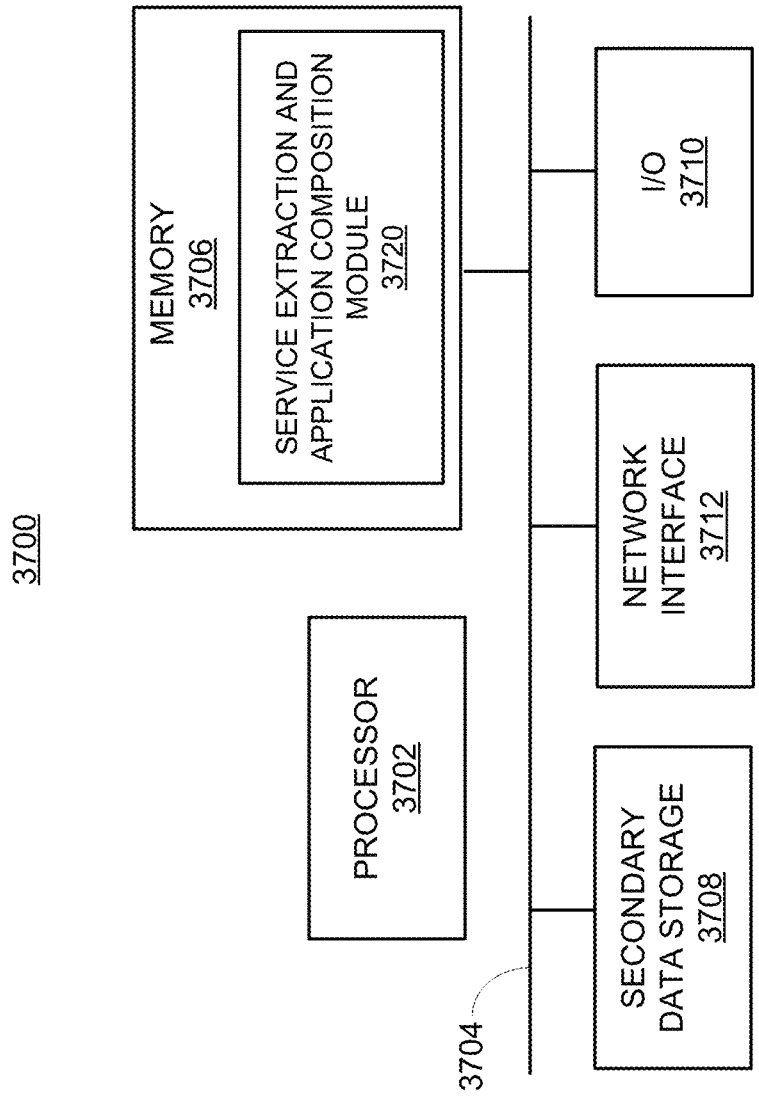
FIG. 37 illustrates a computer system, according to an example of the present disclosure.

FIG. 37 shows a computer system 3700 that may be used with the examples described herein. The computer system may represent a generic platform that includes components that may be in a server or another computer system. The computer system 3700 may be used as a platform for the system 100. The computer system 3700 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 3700 may include a processor 3702 that may implement or execute machine readable instructions performing some or all of the methods, functions and other processes described herein. Commands and data from the processor 3702 may be communicated over a communication bus 3704. The computer system may also include a main memory 3706, such as a random access memory (RAM), where the machine readable instructions and data for the processor 3702 may reside during runtime, and a secondary data storage 3708, which may be non-volatile and stores machine readable instructions and data. The memory and data storage are examples of computer readable mediums. The memory 3706 may include a service extraction and application composition module 3720 including machine readable instructions residing in the memory 3706 during runtime and executed by the processor 3702. The service extraction and application composition module 3720 may include the elements of the system 100 shown in FIG. 1.

The computer system 3700 may include an I/O device 3710, such as a keyboard, a mouse, a display, etc. The computer system may include a network interface 3712 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A service extraction and application composition system comprising:
   at least one processor; and
   a preprocessor, executed by the at least one processor, to preprocess and instrument an existing application that is to be converted to a service-oriented application by injecting instrumentation code into the existing application by identifying a code signature where a service of services related to the existing application is initiated and injecting the instrumentation code at a location of the code signature, wherein
      the code signature is obtained from a code signature library that includes a plurality of code signatures that are specific to particular types of existing applications including the existing application,
      the code signature is identified based on the particular type of the existing application, and
      the code signature includes at least one code point where the service of the services related to the existing application is initiated;
   a trace generator to execute the preprocessed and instrumented existing application to generate traces related to a runtime behavior of the services related to the existing application, and traces related to parameters and values for the parameters that are received by methods that are invoked by the existing application, wherein a method is identified by the code signature and includes the instrumentation code injected at the location of the code signature, and wherein the instrumentation code is used to generate the traces that include the parameters and the values for the parameters;

a calling code generator to utilize the traces related to the runtime behavior of the services related to the existing application to generate calling code related to the services related to the existing application;

a code generator to generate representational state transfer (REST) application programming interfaces (APIs) that include the calling code to call the services related to the existing application;

a refactored code generator to generate refactored code for the existing application by at least one of modifying source code of the existing application and adding new code to the source code of the existing application for invocation of the services related to the existing application by the REST APIs; and a package generator to utilize the REST APIs and the refactored code for the existing application to generate the service-oriented application by wrapping the refactored code for the existing application in a facade layer, the facade layer including the REST APIs and exposing the REST APIs for the services related to the existing application.

2. The service extraction and application composition system according to claim 1, further comprising:
a service modifier to at least one of add, delete, and modify the services related to the existing application.

3. The service extraction and application composition system according to claim 1, wherein the existing application is a n-tier legacy application that does not include a service-oriented architecture.

4. The service extraction and application composition system according to claim 1, wherein the instrumentation code injected into the existing application provides for extraction of functionality of the existing application.

5. The service extraction and application composition system according to claim 1, wherein the trace generator is to execute the preprocessed and instrumented existing application to further generate REST service definitions.

6. The service extraction and application composition system according to claim 1, wherein the calling code includes an existing application invocation code for invoking a specified part of the existing application that is related to invocation of a REST API of the REST APIs.

7. A non-transitory computer readable medium having stored thereon machine readable instructions for service extraction and application composition, the machine readable instructions when executed cause a processor to:
inject instrumentation code into an existing application that is to be converted to a service-oriented application by identifying a code signature where a service of services related to the existing application is initiated and injecting the instrumentation code at a location of the code signature to preprocess and instrument the existing application, wherein
the code signature is obtained from a code signature library that includes a plurality of code signatures that are specific to particular types of existing applications including the existing application,
the code signature is identified based on the particular type of the existing application, and
the code signature includes at least one code point where the service of the services related to the existing application is initiated;

generate traces related to a runtime behavior of the services related to the existing application by executing the preprocessed and instrumented existing application;

generate traces related to parameters and values for the parameters that are received by methods that are invoked by the existing application, wherein a method is identified by the code signature and includes the instrumentation code injected at the location of the code signature, and wherein the instrumentation code is used to generate the traces that include the parameters and the values for the parameters;

generate calling code related to the services related to the existing application by utilizing the traces related to the runtime behavior of the services related to the existing application;

generate representational state transfer (REST) application programming interfaces (APIs) that include the calling code to call the services related to the existing application;

generate refactored code for the existing application by at least one of modifying source code of the existing application and adding new code to the source code of the existing application for invocation of the services related to the existing application by the REST APIs; and utilize the REST APIs and the refactored code for the existing application to generate the service-oriented application by wrapping the refactored code for the existing application in a facade layer, the facade layer including the REST APIs and exposing the REST APIs for the services related to the existing application.

8. The non-transitory computer readable medium according to claim 7, wherein the machine readable instructions when executed further cause the processor to:
at least one of add, delete, and modify the services related to the existing application.

9. The non-transitory computer readable medium according to claim 7, wherein the existing application is a n-tier legacy application that does not include a service-oriented architecture.

10. The non-transitory computer readable medium according to claim 7, wherein the instrumentation code injected into the existing application provides for extraction of functionality of the existing application.

11. The non-transitory computer readable medium according to claim 7, wherein the machine readable instructions to generate traces related to a runtime behavior of the services related to the existing application by executing the preprocessed and instrumented existing application, when executed further cause the processor to:
generate REST service definitions.

12. The non-transitory computer readable medium according to claim 7, wherein the machine readable instructions when executed further cause the processor to:
deploy the service-oriented application in a Cloud environment.

13. The non-transitory computer readable medium according to claim 7, wherein the calling code includes an existing application invocation code for invoking a specified part of the existing application that is related to invocation of a REST API of the REST APIs.

14. A method for service extraction and application composition, the method comprising:
   injecting instrumentation code into an existing application that is to be converted to a service-oriented application by identifying a code signature where a service of services related to the existing application is initiated and injecting the instrumentation code at a location of the code signature to preprocess and instrument the existing application, wherein
      the code signature is obtained from a code signature library that includes a plurality of code signatures that are specific to particular types of existing applications including the existing application,
      the code signature is identified based on the particular type of the existing application, and
      the code signature includes at least one code point where the service of the services related to the existing application is initiated;
   generating traces related to a runtime behavior of the services related to the existing application by executing the preprocessed and instrumented existing application;
   generating traces related to parameters and values for the parameters that are received by methods that are invoked by the existing application, wherein a method is identified by the code signature and includes the instrumentation code injected at the location of the code signature, and wherein the instrumentation code is used to generate the traces that include the parameters and the values for the parameters;
   generating calling code related to the services related to the existing application by utilizing the traces related to the runtime behavior of the services related to the existing application;
   generating representational state transfer (REST) application programming interfaces (APIs) that include the calling code to call the services related to the existing application;
   generating refactored code for the existing application by at least one of modifying source code of the existing application and adding new code to the source code of the existing application for invocation of the services related to the existing application by the REST APIs; and
   utilizing the REST APIs and the refactored code for the existing application to generate the service-oriented application by wrapping the refactored code for the existing application in a facade layer, the facade layer including the REST APIs and exposing the REST APIs for the services related to the existing application.

15. The method according to claim 14, further comprising:
   at least one of adding, deleting, and modifying the services related to the existing application.

16. The method according to claim 14, wherein the existing application is a n-tier legacy application that does not include a service-oriented architecture.

17. The method according to claim 14, wherein the instrumentation code injected into the existing application provides for extraction of functionality of the existing application.

18. The method according to claim 14, wherein the calling code includes an existing application invocation code for invoking a specified part of the existing application that is related to invocation of a REST API of the REST APIs.

19. The method according to claim 14, further comprising:
   deploying the service-oriented application in a Cloud environment.

20. The service extraction and application composition system according to claim 1, wherein the service-oriented application is deployed in a Cloud environment.

* * * * *